US012764013B2

(12) United States Patent
Ghalyan et al.

(10) Patent No.: US 12,764,013 B2
(45) Date of Patent: Oct. 13, 2026

(54) SYSTEMS AND METHODS FOR DETERMINING CAUSAL RELATIONSHIPS AMONG NETWORK ALARMS

(71) Applicant: JPMORGAN CHASE BANK, N.A., New York, NY (US)

(72) Inventors: Najah Ghalyan, Wayne, NJ (US); Marcus Kaiser, London (GB); Mohammed Ayub, Jersey City, NJ (US); Sean Moran, London (GB)

(73) Assignee: JPMORGAN CHASE BANK, N.A., New York, NY (US)

(*) Notice: Subject to any disclaimer, the term of this patent is extended or adjusted under 35 U.S.C. 154(b) by 0 days.

(21) Appl. No.: 18/412,338

(22) Filed: Jan. 12, 2024

(65) Prior Publication Data

US 2025/0233792 A1 Jul. 17, 2025

(51) Int. Cl.

*H04L 41/0631* (2022.01)
*H04L 41/06* (2022.01)
*H04L 41/0604* (2022.01)

(52) U.S. Cl.

CPC ............ *H04L 41/065* (2013.01); *H04L 41/06* (2013.01); *H04L 41/0604* (2013.01); *H04L 41/064* (2013.01)

(58) Field of Classification Search

CPC ... H04L 41/065; H04L 41/06; H04L 41/0631; H04L 41/064

See application file for complete search history.

(56) References Cited

U.S. PATENT DOCUMENTS

| | | | | |
|---|---|---|---|---|
| 9,836,952 | B2 * | 12/2017 | Kushnir | G08B 29/02 |
| 11,438,212 | B2 * | 9/2022 | Li | H04L 41/064 |
| 12,301,405 | B2 * | 5/2025 | Zhou | H04L 41/12 |
| 2015/0280968 | A1 * | 10/2015 | Gates | G06F 11/0769 714/37 |
| 2017/0294112 | A1 * | 10/2017 | Kushnir | G08B 29/02 |
| 2021/0014103 | A1 * | 1/2021 | Zhang | H04L 41/0677 |
| 2022/0207988 | A1 * | 6/2022 | Ghosh | G08B 29/186 |
| 2023/0102002 | A1 * | 3/2023 | Garapati | G06N 5/022 709/223 |
| 2024/0007342 | A1 * | 1/2024 | Gupta | H04L 41/16 |
| 2024/0103510 | A1 * | 3/2024 | Timmaraju | G05B 23/0281 |
| 2024/0118965 | A1 * | 4/2024 | Ashrafi | G06F 11/079 |
| 2024/0146622 | A1 * | 5/2024 | Khan | H04L 41/22 |

* cited by examiner

*Primary Examiner* — Kamal B Divecha
(74) *Attorney, Agent, or Firm* — GREENBERG TRAURIG LLP

(57) ABSTRACT

In some aspects, the techniques described herein relate to a method including: receiving, at an alarm management service, a plurality of alarms, wherein each of the plurality of alarms includes respective alarm data; clustering the plurality of alarms into an alarm cluster group; generating a plurality of binary time sequences, wherein each of the plurality of binary time sequences corresponds to one of the plurality of alarms; generating an initial alarm graph based on the alarm cluster group and the plurality of binary time sequences; providing, as input to a causal inference process, the initial alarm graph and the plurality of binary time sequences; and generating, by the causal inference process, a causal alarm graph, wherein the causal alarm graph is a partially connected and directed graph.

6 Claims, 6 Drawing Sheets

200

210 220 230 240

| alarm_id | device_id | start_timestamp | end_timestamp |
|---|---|---|---|
| 2 | 4 | 30684 | 32416 |
| 10 | 4 | 30684 | 30867 |
| 7 | 1 | 30795 | 32668 |
| 2 | 5 | 32215 | 32867 |

Alarm Cluster Group Data 702

Persistence diagram 704

SYSTEMS AND METHODS FOR DETERMINING CAUSAL RELATIONSHIPS AMONG NETWORK ALARMS

BACKGROUND

1. Field of the Invention

Aspects generally relate to systems and methods for determining causal relationships among network alarms.

2. Description of the Related Art

In telecommunication networks, anomalies are commonly identified through alarms. Administrators of enterprise networks may face many (even millions) of alarms per day due to the large scale and the interrelated structure of an enterprise network. Many alarms generated in an anomalous event can be the result of a single fault or failure in a network device or service. Due to the high number of dependencies network devices and services have, a single fault or failure may trigger a cascade of various other alarms on multiple connected devices. A goal of network administrators is to quickly localize the causal failure point that has triggered multiple network alarms, since alleviating the causal anomaly will often alleviate many if not all of the resultant alarm conditions that have been triggered. In the face of tens, hundreds, or even more alarms received within a relatively short amount of time, however, determining a causal chain that points to a single causal failure or condition can be overwhelming and time consuming for network administrators.

SUMMARY

In some aspects, the techniques described herein relate to a method including: receiving, at an alarm management service, a plurality of alarms, wherein each of the plurality of alarms includes respective alarm data; clustering the plurality of alarms into an alarm cluster group; generating a plurality of binary time sequences, wherein each of the plurality of binary time sequences corresponds to one of the plurality of alarms; generating an initial alarm graph based on the alarm cluster group and the plurality of binary time sequences; providing, as input to a causal inference process, the initial alarm graph and the plurality of binary time sequences; and generating, by the causal inference process, a causal alarm graph, wherein the causal alarm graph is a partially connected and directed graph.

In some aspects, the techniques described herein relate to a method, wherein the respective alarm data includes an alarm identifier, a device identifier, an alarm start timestamp and an alarm end timestamp.

In some aspects, the techniques described herein relate to a method, wherein each of the plurality of binary time sequences is generated based on an alarm start timestamp and an alarm end timestamp of a corresponding alarm.

In some aspects, the techniques described herein relate to a method, wherein the initial alarm graph is a fully connected, undirected graph.

In some aspects, the techniques described herein relate to a method, including: deleting an edge from between a first node of the initial alarm graph and a second node of the initial alarm graph based on an absence of a network connection between a network device represented by the first node and a network device represented by the second node.

In some aspects, the techniques described herein relate to a method, including: deleting an edge from between a first node of the initial alarm graph and a second node of the initial alarm graph based on absence of an alarm represented by the first node from the alarm cluster group.

In some aspects, the techniques described herein relate to a method, including: deleting an edge from between a first node of the initial alarm graph and a second node of the initial alarm graph based on absence of overlap in associated binary times series of the first node and the second node.

In some aspects, the techniques described herein relate to a system including at least one computer including a processor, wherein the at least one computer is configured to: receive, at an alarm management service, a plurality of alarms, wherein each of the plurality of alarms includes respective alarm data; cluster the plurality of alarms into an alarm cluster group; generate a plurality of binary time sequences, wherein each of the plurality of binary time sequences corresponds to one of the plurality of alarms; generate an initial alarm graph based on the alarm cluster group and the plurality of binary time sequences; provide, as input to a causal inference process, the initial alarm graph and the plurality of binary time sequences; and generate, by the causal inference process, a causal alarm graph, wherein the causal alarm graph is a partially connected and directed graph.

In some aspects, the techniques described herein relate to a system, wherein the respective alarm data includes an alarm identifier, a device identifier, an alarm start timestamp and an alarm end timestamp.

In some aspects, the techniques described herein relate to a system, wherein each of the plurality of binary time sequences is generated based on an alarm start timestamp and an alarm end timestamp of a corresponding alarm.

In some aspects, the techniques described herein relate to a system, wherein the initial alarm graph is a fully connected, undirected graph.

In some aspects, the techniques described herein relate to a system, wherein the at least one computer is configured to: deleting an edge from between a first node of the initial alarm graph and a second node of the initial alarm graph based on an absence of a network connection between a network device represented by the first node and a network device represented by the second node.

In some aspects, the techniques described herein relate to a system, wherein the at least one computer is configured to: deleting an edge from between a first node of the initial alarm graph and a second node of the initial alarm graph based on absence of an alarm represented by the first node from the alarm cluster group.

In some aspects, the techniques described herein relate to a system, wherein the at least one computer is configured to: deleting an edge from between a first node of the initial alarm graph and a second node of the initial alarm graph based on absence of overlap in associated binary times series of the first node and the second node.

In some aspects, the techniques described herein relate to a non-transitory computer readable storage medium, including instructions stored thereon, which instructions, when read and executed by one or more computer processors, cause the one or more computer processors to perform steps including: receiving, at an alarm management service, a plurality of alarms, wherein each of the plurality of alarms includes respective alarm data; clustering the plurality of alarms into an alarm cluster group; generating a plurality of binary time sequences, wherein each of the plurality of binary time sequences corresponds to one of the plurality of alarms; generating an initial alarm graph based on the alarm cluster group and the plurality of binary time sequences; providing, as input to a causal inference process, the initial alarm graph and the plurality of binary time sequences; and generating, by the causal inference process, a causal alarm graph, wherein the causal alarm graph is a partially connected and directed graph.

In some aspects, the techniques described herein relate to a non-transitory computer readable storage medium, wherein the respective alarm data includes an alarm identifier, a device identifier, an alarm start timestamp and an alarm end timestamp.

In some aspects, the techniques described herein relate to a non-transitory computer readable storage medium, wherein each of the plurality of binary time sequences is generated based on an alarm start timestamp and an alarm end timestamp of a corresponding alarm.

In some aspects, the techniques described herein relate to a non-transitory computer readable storage medium, wherein the initial alarm graph is a fully connected, undirected graph.

In some aspects, the techniques described herein relate to a non-transitory computer readable storage medium, including: deleting an edge from between a first node of the initial alarm graph and a second node of the initial alarm graph based on an absence of a network connection between a network device represented by the first node and a network device represented by the second node.

In some aspects, the techniques described herein relate to a non-transitory computer readable storage medium, including: deleting an edge from between a first node of the initial alarm graph and a second node of the initial alarm graph based on absence of an alarm represented by the first node from the alarm cluster group.

DETAILED DESCRIPTION

Aspects generally relate to systems and methods for determining causal relationships among network alarms.

In a telecommunications or computer network, devices that are operatively connected to the network may be configured to generate an alarm or alert when any of a number of defined conditions are met. The conditions on which an alarm is generated may indicate an outright failure or underperformance (with respect to an established baseline) of a network device or of software executing on a network device. These alarms are generally received, displayed, and managed through one or more central management software services that monitor network devices and/or software executing on network devices.

Aspects described herein may be implemented in an alarm management service that is executed on a technology infrastructure of an implementing organization. An exemplary alarm management service may execute on a device that is operatively connected to a computer network and may receive network alarms generated by devices that are also operatively connected to the computer network. An alarm management service may be configured to process alarm data received from network devices as described herein. In some aspects, an alarm management service may include agent or client software that is deployed at network devices and is configured to monitor network devices for anomalous conditions. In other aspects, an alarm management service may be configured to receive alarms that are generated from a network device's operating system, firmware, etc. An alarm management service may be configured to use a standardized management protocol, such as simple network management protocol (SNMP).

In accordance with aspects, an alarm management service may include, receive, and/or collect network data and compile the network data in the form of a network topology. As used herein, a network topology is data that represents the arrangement of devices on a computer or telecommunications network. A network topology may include data that represents network devices, descriptive device data, links between network devices, etc. A network topology may be used to visualize the arrangement of a network (e.g., network devices and their connection(s), and connection type, to each other). An exemplary visual depiction of a network topology is a graph where nodes of the graph represent network devices and edges of the graph represent connections between the device. A topology may be stored and presented as a graph by an alarm management service.

Figures 1, 2:
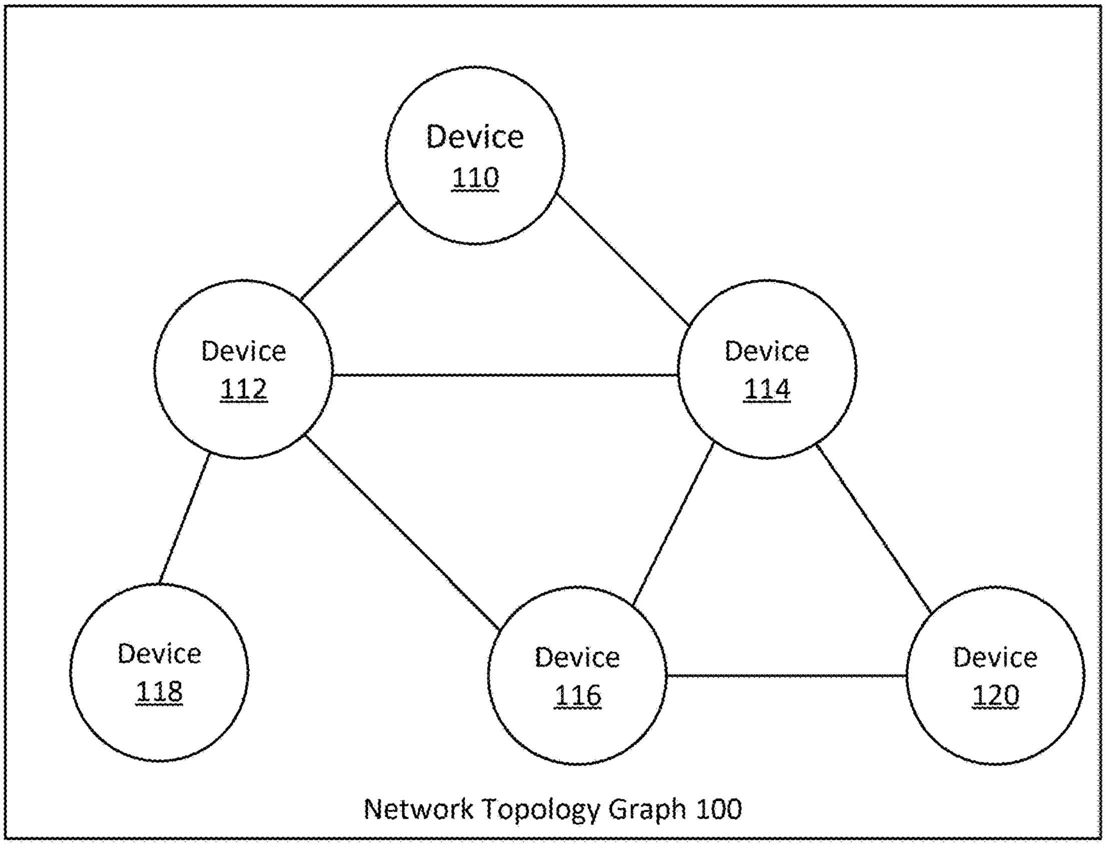
FIG. 1 depicts a network topology graph, in accordance with aspects.
FIG. 2 is a matrix of alarm data, in accordance with aspects.

FIG. 1 depicts a network topology graph, in accordance with aspects. Network topology graph 100 includes device node 110, device node 112, device node 114, device node 116, device node 118, and device node 120. Each device node included in network topology graph 100 represents a device on a computer or telecommunications network of an implementing organization's technology infrastructure. The device nodes may represent physical devices, virtual devices, software instances that execute on devices, or other physical or logical entities that may be present and interconnected on the represent network. The lines connecting the various device nodes of network topology graph 100 are graph edges that represent a network connection between the devices represented by each node. The edges may represent a wired connection or a wireless connection between network devices/instances. Network topology graph 100 is an undirected graph, since the edges do not have arrows on one end indicating a direction. Edges in an undirected graph merely indicate some relationship between the nodes. A network topology graph (and all other graphs described herein) may be stored (e.g., by an alarm management system) as a graph data structure, in a graph database, etc., and may be displayed via an interface as a graph for rapid visualization of a represented network's topology.

Aspects may generate a causal alarm graph that may be a directed graph that describes causation of network alarms among network devices. Aspects may provide casual relationships (e.g., directed edges in a graph) without access to certain performance metrics that are gathered from network devices and that may traditionally be used to determine causality of network alarms. Examples of such performance metrics (or performance data) include device metrics such as CPU usage, memory usage, storage usage and/or performance (e.g., read/write metrics from a storage disk), network interface performance (e.g., total bandwidth and percent bandwidth usage) etc. Aspects described herein may operate with consideration only to "alarm data."

Aspects may generate a causal graph solely based on the alarm data without requiring access to devices' metrics. However, these alarm data are usually generated using the devices metrics, e.g., by implementing anomaly detection to the devices' metrics and generating alarm data. Therefore, the causal inference techniques described herein may indirectly consider and/or depend on devices metrics. However, direct dependency of the proposed inference techniques on alarm data only could be useful in different scenarios.

For instance, it may not be desirable for the network computer/node that executes the causal inference techniques to have access to a device's metrics e.g., due to privacy restrictions. This may be of particular concern if the causal inference is executed on a third party's computer/node. In another scenario, it may be desirable to implement the proposed causal inference techniques on multiple networks. Then causal inference may be executed on a central computer/node that receives only alarm data, instead of devices' metrics, from these multiple networks. The alarm data could be much smaller than the devices metrics and therefore easier to transmit to the inference execution computer/node.

Alarm data (as the term is used herein, and as opposed to performance data as described, above) may include as few as four parameters. These parameters may include and alarm identifier (ID) a device ID, a start timestamp, and an end timestamp. An alarm ID includes data that indicates a type of alarm. A device ID is an identifier of the network device that generated a particular network alarm. A start timestamp may identify a time when the alarm started (e.g., when the alarm condition became present or true) and an end timestamp may identify a time when the alarm stopped or subsided (e.g., when the alarm condition ceased to be present or true). The duration of time recorded between an alarm start timestamp and an alarm end timestamp may provide the duration of an associated network alarm. Other metrics, such as performance data (as described above), may be applied in, e.g., a preprocessing layer of aspects described herein in order to enrich collected information. Minimal aspects, however, may rely solely on the alarm data described, above. As used herein, the term "alarm" or "network alarm" includes, at a minimum, the four data components of alarm data described, above.

FIG. 2 is a matrix of alarm data, in accordance with aspects. Each row in matrix 200 represents data included in a network alarm. Column 210 is alarm ID data, column 220 is device ID data, column 230 is start timestamp data and column 240 is end timestamp data. Start timestamp data and end timestamp data may be absolute time data (e.g., timestamps based on an epoch such as the Unix® epoch), or may be relative time data, according to aspects.

Alarm data may be received at an alarm management service and may be used as input to a causal graph generation process. Alarm data may be clustered into groups that represent related anomalies. That is, alarms that are included in a "cluster" or cluster group may represent alarms that are likely related to a single anomalous event. In accordance with aspects, alarm clusters may be based on time factors and/or using persistent homology techniques. In forming alarm clusters, a logical process may be configured to group alarms having a certain elapsed time between events and exclude alarms having a higher elapsed time between alarms, since a relatively higher elapsed time reduces the chance that the alarms are related to the same causal condition. Accordingly, alarm clusters may be generated based on when a particular alarm occurred with respect to other alarms within predefined time constraints.

Persistent homology is a mathematical tool used in topological data analysis to understand the shape and structure of data. While not a clustering method itself, persistent homology may be applied to data to reveal its topological features that, in turn, may be used to capture data clusters. In using persistent homology, aspects may convert data points into a simplicial complex, which captures the connectivity between points at different scales. This may be achieved through methods such as Vietoris-Rips or Čech complexes. Once the simplicial complex is formed, a filtration process may be applied by gradually increasing a parameter (often representing distance or scale). This creates a sequence of nested simplicial complexes, revealing the evolution of topological features as the parameter changes.

Figure 7:
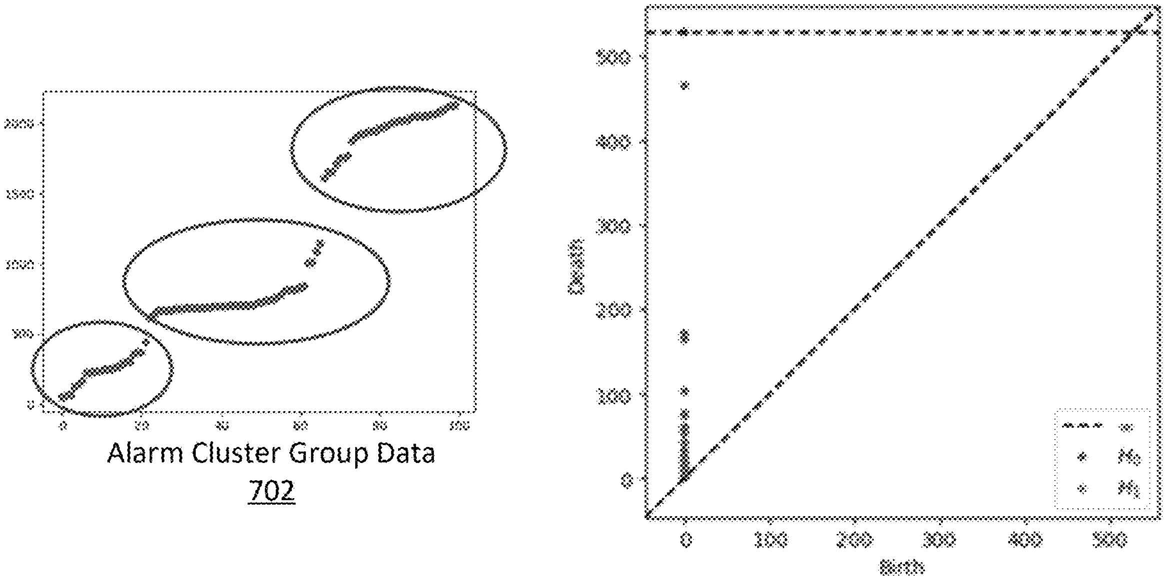
FIG. 7 is a depiction of a persistence diagram and corresponding alarm cluster groups, in accordance with aspects.

FIG. 7 is a depiction of a persistence diagram and corresponding alarm cluster groups, in accordance with aspects. FIG. 7 incudes alarm cluster group data 702 and persistence diagram 704. Persistent homology analyzes the lifespan of topological features (connected components, loops, voids, etc.) throughout the filtration process. It identifies significant topological structures that persist across multiple scales, capturing the essence of the data's shape. The output of persistent homology is represented in a persistence diagram, such as persistence diagram 704, which visualizes the birth and death of topological features as points in a plane. Clustering techniques can be applied to these diagrams to group similar topological features or patterns, providing insights into the data's inherent structure. Alarm cluster group data 702 is an exemplary depiction of clustering based on a persistence diagram.

While persistent homology itself doesn't perform clustering directly, the information it extracts about the data's shape and topological features may be used in clustering or classification tasks to enhance understanding or aid in grouping similar data points based on their topological properties. Unlike other clustering techniques, such as K-means, this method does not require prior knowledge of number of clusters. This is useful with respect to techniques described herein because given a large number of alarms there is typically not knowledge of how many outages (i.e., independent root causes) have generated these alarms.

For a given cluster of alarms, a binary time sequence may be generated for each alarm within the cluster. A binary time series may be a string of "1" and "0" characters. The string need not be of a fixed length and may be based on an alarm start timestamp and an alarm end timestamp. A binary time series of an alarm may represent the time intervals and/or duration of an alarm. For instance, a "1" character may be inserted into a binary sequence in order to describe a time interval that is associated with a particular alarm ID generated by a particular device (represented by a device ID). In an exemplary binary time sequence generated for a received alarm ID, a binary sequence may be created, where a "0" in the binary sequence indicates that the associated alarm was not active and a "1" in the binary sequence indicates that the associated alarm ID was active. In an exemplary aspect, an alarm ID may have 12 timestamps, where each timestamp is represented by an index in a binary sequence. Then, given one alarm that started at timestamp=index 3 and ended at timestamp=index 6 the binary sequence 001111000000 may be generated to describe the alarm ID (where a "1" in the sequence indicates the presence of an alarm at the corresponding timestamp).

Alarm IDs may be identified in different ways depending on a particular use case. This may be true even for the same network. For instance, given a network of 5000 hosts connected together, each host may have four types of metrics (e.g., CPU metrics, memory metrics, storage metrics, and network interface metrics). A goal in this scenario may be to generate a causal graph that estimates causal relationships between the hosts, describing which host anomaly caused other hosts to be anomalous. If alarm ID=host ID, this would generate 5,000 alarm IDs. The goal, however, may be to achieve more granularity, For instance, it may be desirable to generate a causal graph that estimates a causal relationship between nodes given by the pair (host ID, metric type). For example, a bad storage disk in this host caused anomalies in CPU usage in other hosts. Then, identifying alarm ID as (host ID, metric type), would generate 5,000×4=20,000 alarms IDs.

Accordingly, generating alarm data for alarm IDs may typically be accomplished by implementing anomaly detection for each Alarm ID metric. For instance, in a scenario where each Alarm ID has a time series metric, an anomaly detection may be implemented to identify intervals where the metric behaves abnormally, which would generate alarm intervals for that Alarm ID.

Figure 3:
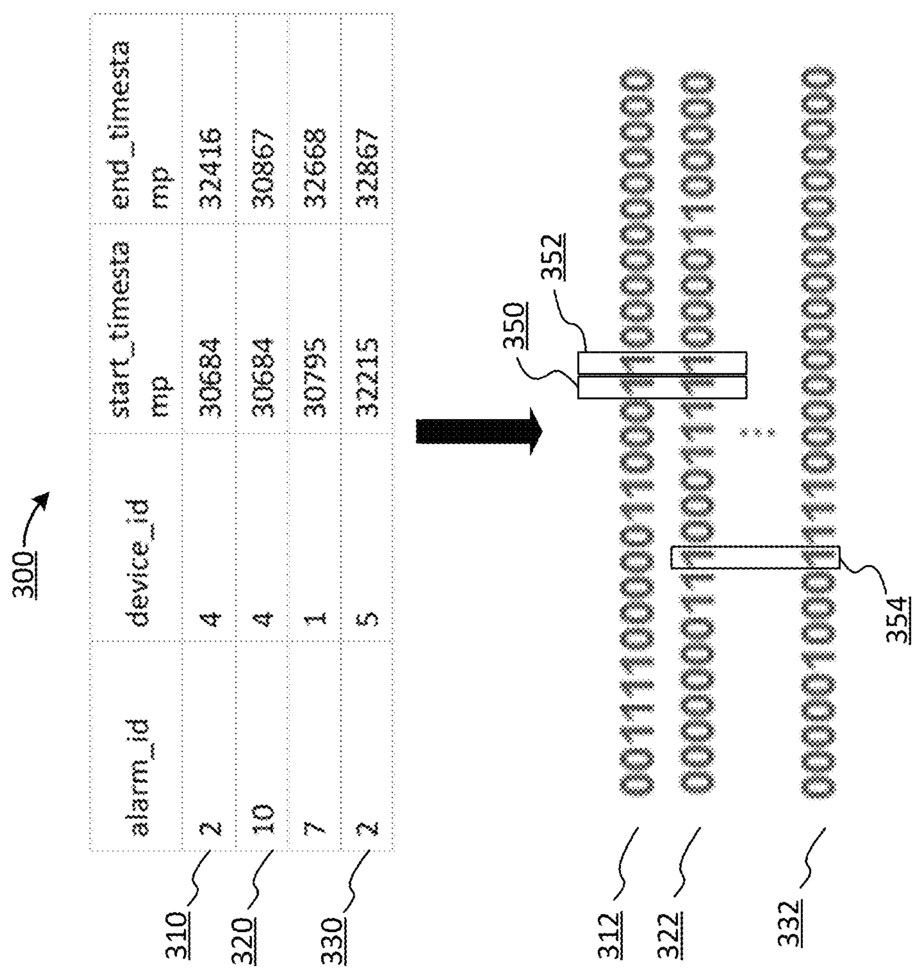
FIG. 3 depicts exemplary binary time sequences generated from exemplary alarm data, in accordance with aspects.

FIG. 3 depicts exemplary binary time sequences generated from exemplary alarm data, in accordance with aspects. Alarm data matrix 300 is a matrix of alarm data where each row in the matrix represents alarm data associated with a network alarm. Each of row 310, row 320, and row 330 is alarm data that is included in a corresponding alarm. In a binary time sequence generation process, alarm data that is associated with each alarm is transformed into a binary sequence, as described herein. For instance, binary time sequence 312 may be generated from the start timestamp and the end timestamp of the alarm associated with row 310. Likewise, binary time sequence 322 may be generated from the start timestamp and the end timestamp of the alarm associated with row 320, and binary time sequence 332 may be generated from the start timestamp and the end timestamp of the alarm associated with row 330.

In accordance with aspects, received alarm data may be used to generate an initial alarm graph. An initial alarm graph may be undirected and may be fully connected. For instance, a graph node may be generated for each received alarm ID in received alarm data. Edges between nodes in an initial alarm graph may then be dropped (i.e., deleted) or retained based on "valid pairing" conditions.

In accordance with aspects, a valid pairing in an initial alarm graph may be determined using a network topology, alarm clusters, and binary time sequences. In an exemplary process, a received alarm ID may be checked for inclusion in an alarm cluster group. Each edge that connects an alarm ID node to another alarm ID node that is not included in a same alarm cluster group may be dropped from the graph. This may result in a number of initial alarm graphs whose nodes correspond to the alarm IDs that are members of a particular alarm cluster group.

A further condition for a valid pairing in an initial alarm graph may include operative network connectivity between devices represented by device IDs in received alarm data. This condition may be based on the assumption that, even if a first alarm is included in an alarm ID cluster group with a second alarm or the first alarm's binary time sequence overlaps with the second alarm's binary time sequence (as discussed further, herein), if the respective devices that issued the alarms are not connected through a physical/wireless network, then the first alarm could not have caused the second alarm (or vice versa). Connectivity may be determined using a network topology and device IDs that are associated with received alarms. For instance, if two alarms are received, the respective device IDs may be retrieved, and a network topology may be evaluated to determine whether a network connection exists between the two device IDs. All edges in an initial alarm graph between nodes having associated device IDs that represent respective devices that are not connected on a network may be dropped.

An additional condition for a valid pairing in an initial alarm graph may include the concept of a "overlap" among binary time sequences of alarm IDs. In order to measure overlap, two or more binary sequences may be stacked in a matrix form, such that a matrix row includes every character in a single binary time sequence, and the columns of the matrix are formed from one character from each included binary time sequence at a similar row index. Overlap may be determined to have occurred between two alarms (i.e., two alarms happened simultaneously or substantially simultaneously) if both binary sequences include a "1" in the same column (i.e., at the same character index).

With additional reference to FIG. 3, the "1" characters in index column 350 and index column 352 show overlap between binary time sequence 312 and binary time sequence 322. Likewise, the "1" characters in index column 354 shows overlap between binary time sequence 322 and 332.

In some aspects, binary time sequences may include a buffer to extend a time period of an associated alarm (either before the start of the alarm or after the end of the alarm). A buffer may account for small time gaps between an ending of one alarm and the beginning of another alarm, since small time gaps may likely indicate that the alarms are related, as opposed to larger time gaps that are more likely to indicate that there is no relation between alarms. A determination of overlap may include any buffers that have been added to a binary time sequence of an alarm.

In accordance with aspects, a valid pairing may include the condition of overlap (as discussed herein) between the binary sequences of two alarms. Any edges present in an initial alarm graph between two nodes whose respective binary sequences do not meet the described overlap condition may be dropped from the initial alarm graph. Additionally, any node that does not retain a connection to another node in an initial alarm graph may be dropped from the graph.

In sum, in order to maintain an edge between nodes in an initial alarm graph, there must be a valid pairing between the nodes. A valid pairing condition may include a determination that 1) two alerts were generated by network-connected devices, 2) the two alerts were included in the same alert cluster group, and/or 3) there is overlap in the binary sequence of the two alerts. In some aspects, these conditions may be met individually to constitute a valid pairing. In other aspects, these conditions may each be needed (i.e., all three conditions must be met) in order to constitute a valid pairing between nodes.

After a valid pairing determination process is executed with respect to an initial alarm graph, the result may be a partially connected undirected graph. A further step in a causal alarm graph generation process may include determining a direction of each edge remaining in the initial alarm graph.

In accordance with aspects, determining edge directions in an initial alarm graph may transform the graph into a partially connected, directed graph that is a causal alarm graph. An edge direction from a first node to a second node may imply that the first node (which represents a first alarm) was a causal factor in the occurrence of the second node (which represents a second alarm). Accordingly, a causal alarm graph may be traversed in reverse (i.e., traversing the graph in the opposite direction indicated by the directed edges) in order to determine one or more alarm nodes that are, or may be, a root causal factor in the graph. Since the graph represents alarms that were part of an alarm cluster group, and the alarm cluster group clusters alarms that are related to a particular incident, a network administrator may use a causal alarm graph to quickly and efficiently determine one or more (likely) root causal alarms, and remedy the condition causing the root causal alarms, which may, in turn, remedy the alarms that were trigged due to a dependency on the causal condition.

In determining edge directions, a causal inference algorithm or process may be used. A causal inference process may utilize binary time sequences generated for received alarms. A binary time sequence may be used to determine, between two alarms, which alarm occurred before the other (in most instances). This process may be based on the assumption that a causal alarm condition will occur before an alarm condition that has been trigged based on the causal alarm condition. In a scenario where a first alarm only preceded a second alarm in some occurrences and in other occurrences, or pairs of occurrences, the second alarm preceded the first alarm, then a count of which alarm preceded the other more times may be used to determine the causal alarm and accordingly an appropriate edge direction between alarm nodes.

In accordance with aspects, a causal inference process may determine, for any pair of alarms or alarm IDs i and j, that i caused j if $c(i, j) \geq \lambda c(j, i)$, where i is a first alarm or alarm ID, j is a second alarm or alarm ID, and c is the count of how many times i preceded j (i.e., c(i, j)) or j preceded i (i.e., c(j, i)). A binary time sequence of the alert i and a binary time sequence of the alert j may be used to determine count c. $\lambda \geq 1$ may be a hyperparameter that can be fine-tuned. Where $\lambda = 1$, all edges may be concretely determined. Where $\lambda > 1$, some edge directions may be left unknown.

In some aspects, the frequency of i may be included as a factor in a causal inference process. For instance, c(i, j) may be computed as the number of times i is followed by j divided by how many times i occurs. In some aspects, a delay-weighted count method may be used that assigns weight to a delay factor. A delay-weighted count method may be calculated as $$c(i, j) = \sum_k \frac{1}{d_{ij}^k},$$

where $$\{d_{ij}^k\}$$

is the set of time delays between i and j for all valid pairings of i and j where i is followed by j. Accordingly, a relatively stronger inference of causality will be assigned to i where the delay between i and j is relatively shorter.

Figure 4:
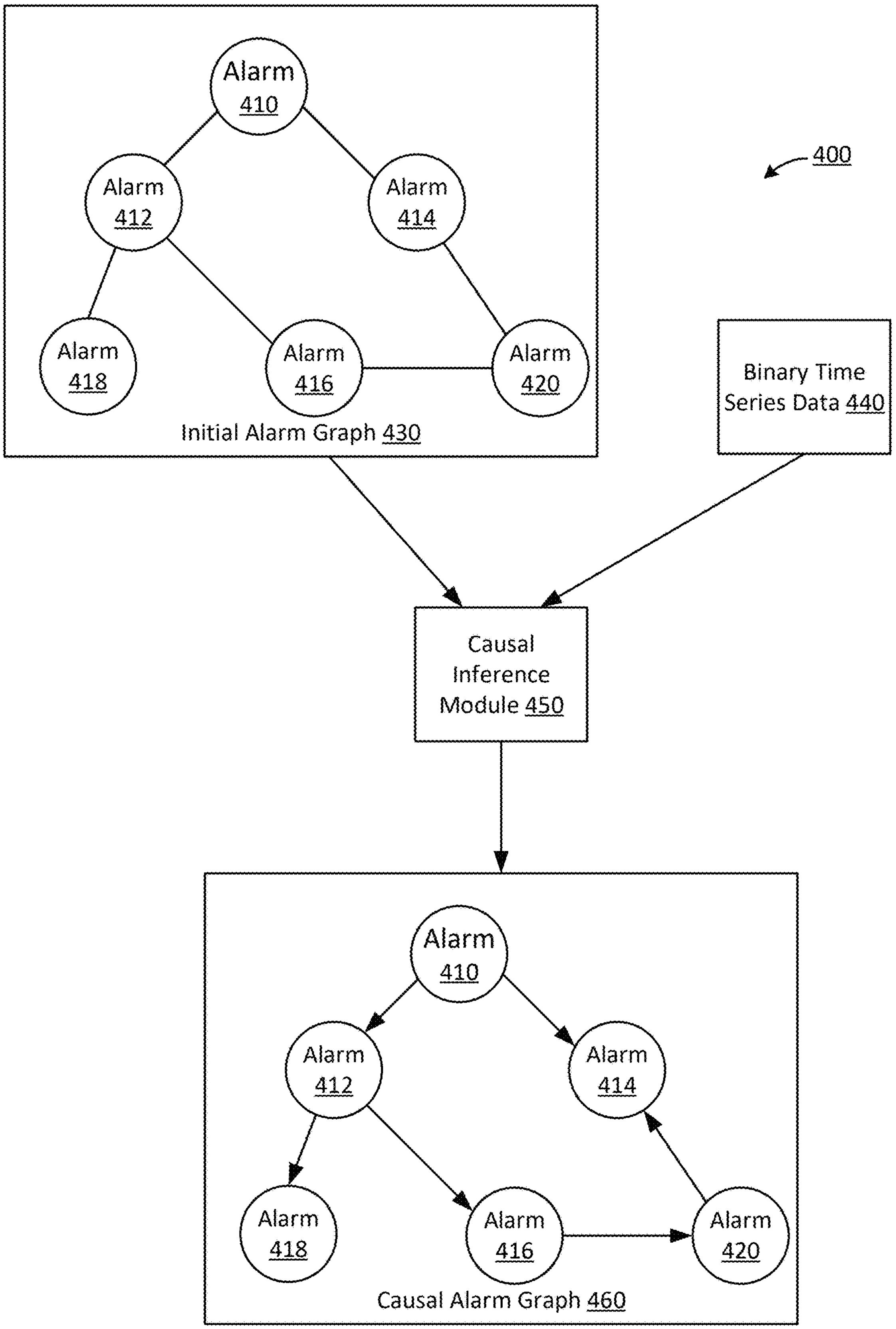
FIG. 4 is a block diagram of a system for generating a causal alarm graph, in accordance with aspects.

FIG. 4 is a block diagram of a system for generating a causal alarm graph, in accordance with aspects. System 400 includes causal inference module 450. Causal inference module 450 includes and executes a causal inference algorithm or process, such as the one described herein. System 400 and/or causal inference module 450 may be included in or as part of an alarm management service, which may be included as part of an implementing organization's technology infrastructure. Causal inference module 450 take initial alarm graph 430 and binary time series data 440 as input. Initial alarm graph 430 is a partially connected, undirected graph, as described herein. Initial alarm graph 430 includes alarm node 410, alarm node 412, alarm node 414, alarm node 416, alarm node 418, and alarm node 420. Binary time series data 440 includes binary time sequences for alarms represented as nodes in initial alarm graph 430. Causal inference module 450 outputs causal alarm graph 460, which is a partially connect, directed graph. Causal inference module 450 generates the directed edges of causal alarm graph 460. Causal alarm graph 460 includes the same nodes as initial alarm graph 430.

In accordance with aspects, additional metrics, such as performance metrics/data, as described above, may be incorporated into the processes described herein. In a network of devices (including, e.g., host entities that may include virtual machines, virtual operating systems, etc.), each device may output a number of performance metrics that may be collected and analyzed (as described above). For each host, a time series of these metrics may be generated. An unsupervised anomaly detection process may be executed, which may include an anomaly detection algorithm that can assess a time window of performance metrics for each host device. For instance, a two-week time window may be assessed. A baseline of healthy (i.e., normal, expected) behavior of a host may be established from the time window. Subsequently, in a sliding window, in real time, whenever there is deviation from the noted healthy behavior, it may be assumed that there is a potential anomaly. Accordingly, a distribution based on a time series for a host device may be collected. A sliding window may be applied to the distribution, and if within the sliding window there is a deviation (e.g., 3 times standard deviation) then this deviation can be flagged as potentially anomalous. The sliding window may be used to generate a binary time sequence, as described herein, and the binary time sequence may be used, as described herein, in generation of a causal alarm graph.

Figure 5:
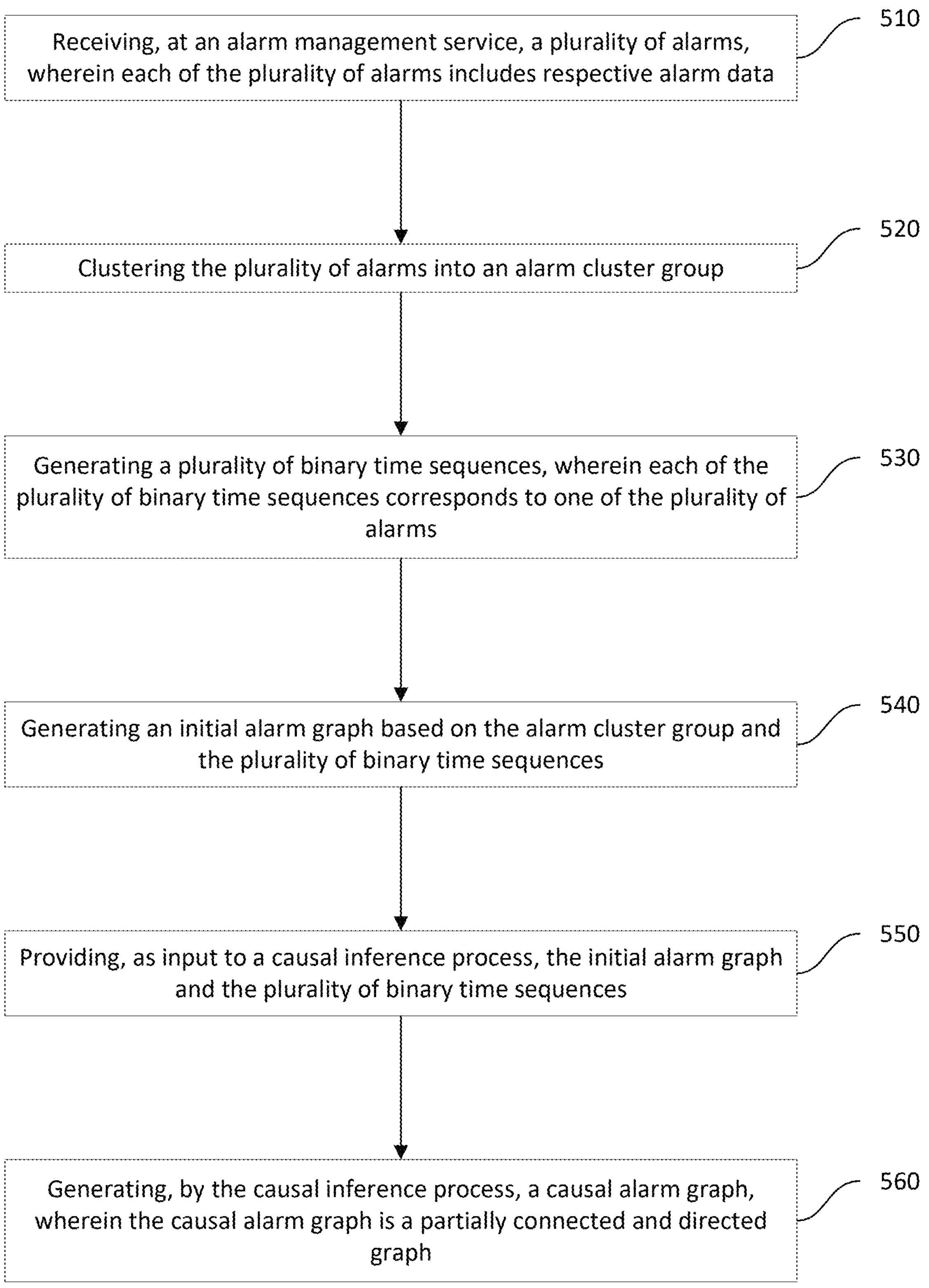
FIG. 5 is a logical flow for determining causal relationships among network alarms, in accordance with aspects.

FIG. 5 is a logical flow for determining causal relationships among network alarms, in accordance with aspects.

Step 510 includes receiving, at an alarm management service, a plurality of alarms, wherein each of the plurality of alarms includes respective alarm data.

Step 520 includes clustering the plurality of alarms into an alarm cluster group.

Step 530 includes generating a plurality of binary time sequences, wherein each of the plurality of binary time sequences corresponds to one of the plurality of alarms.

Step 540 includes generating an initial alarm graph based on the alarm cluster group and the plurality of binary time sequences.

Step 550 includes providing, as input to a causal inference process, the initial alarm graph and the plurality of binary time sequences.

Step 560 includes generating, by the causal inference process, a causal alarm graph, wherein the causal alarm graph is a partially connected and directed graph.

Figure 6:
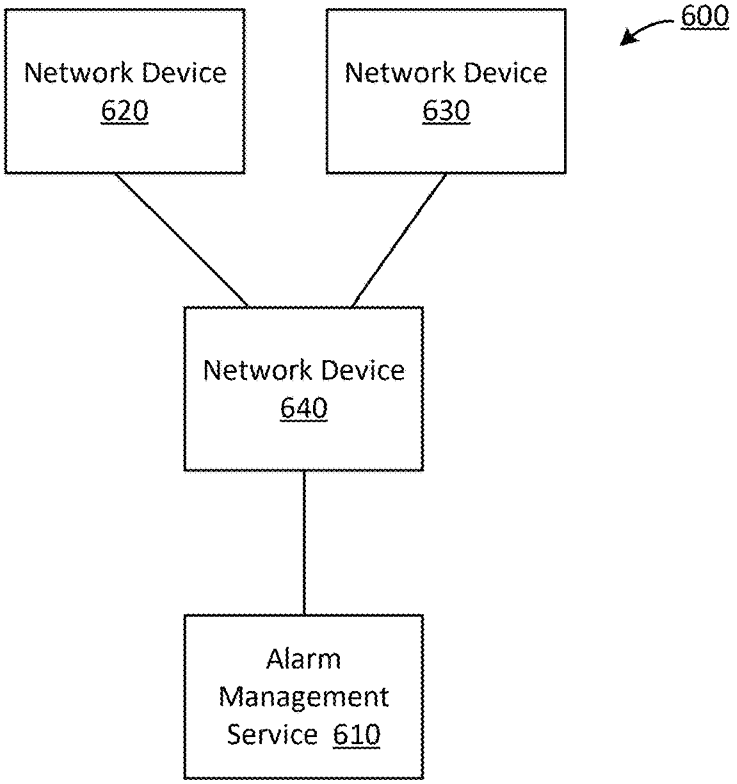
FIG. 6 is a block diagram of a system for determining causal relationships among network alarms, in accordance with aspects.

FIG. 6 is a block diagram of a system for determining causal relationships among network alarms, in accordance with aspects. System 600 includes alarm management service 610, network device 620, network device 630, and network device 640. Alarm management service 610 is an alarm management service, e.g., as described herein. Alarm management service 610 may be a service executed on a server that is operatively connected to a computer or telecommunications network. Network device 620, network device 630, and network device 640 may also be connected the computer or telecommunications network and may be in operative communication with each other and alarm management service 610. Alarm management service 610 may receive network alarms generated by each of network device 620, network device 630, and network device 640.

Figure 8:
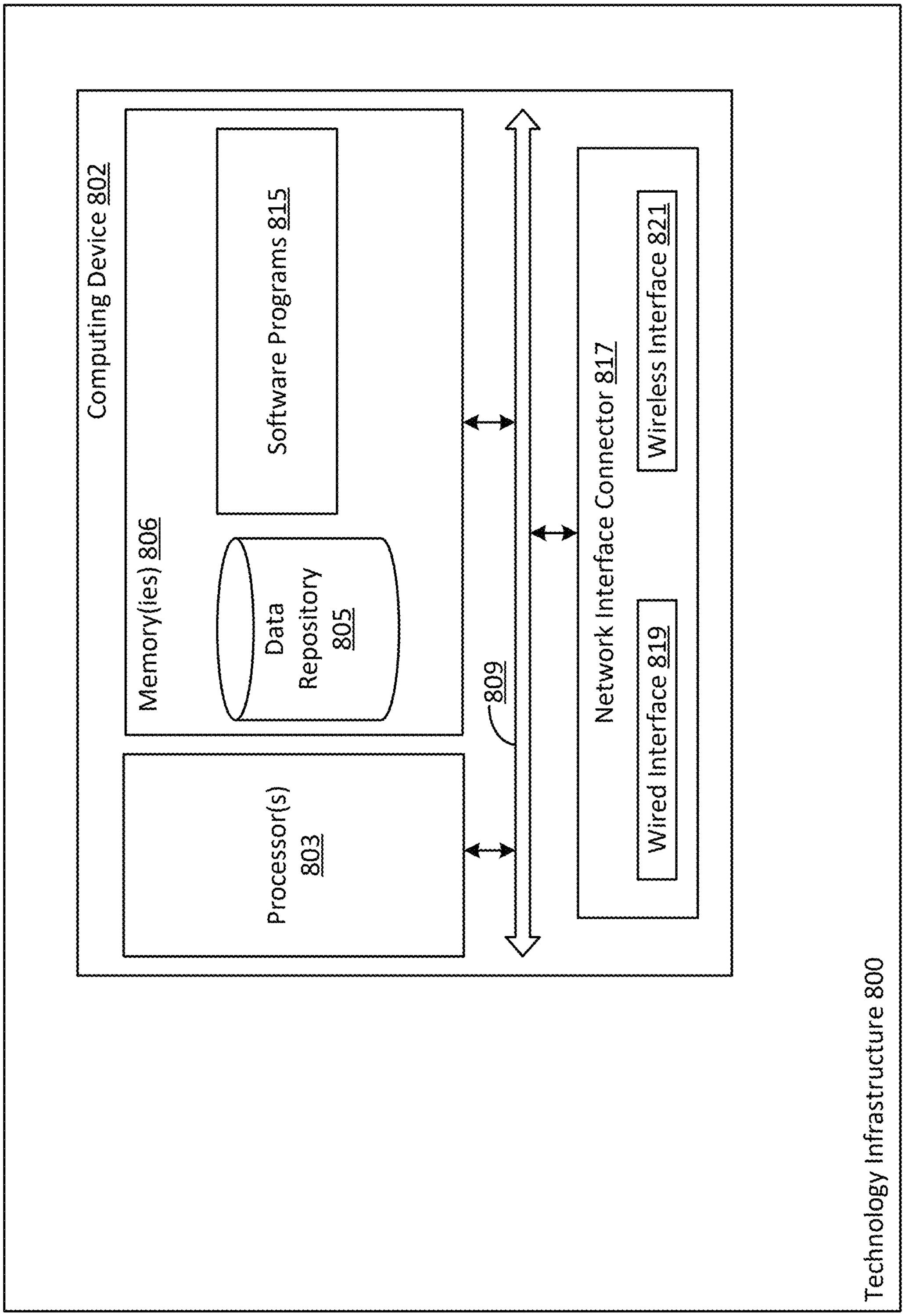
FIG. 8 is a block diagram of a technology infrastructure and computing device for implementing certain aspects of the present disclosure, in accordance with aspects.

FIG. 8 is a block diagram of a technology infrastructure and computing device for implementing certain aspects of the present disclosure, in accordance with aspects. FIG. 8 includes technology infrastructure 800. Technology infrastructure 800 represents the technology infrastructure of an implementing organization. Technology infrastructure 800 may include hardware such as servers, client devices, and other computers or processing devices. Technology infrastructure 800 may include software (e.g., computer) applications that execute on computers and other processing devices. Technology infrastructure 800 may include computer network mediums, and computer networking hardware and software for providing operative communication between computers, processing devices, software applications, procedures and processes, and logical flows and steps, as described herein.

Exemplary hardware and software that may be implemented in combination where software (such as a computer application) executes on hardware. For instance, technology infrastructure 800 may include webservers, application servers, database servers and database engines, communication servers such as email servers and SMS servers, client devices, etc. The term "service" as used herein may include software that, when executed, receives client service requests and responds to client service requests with data and/or processing procedures. A software service may be a commercially available computer application or may be a custom-developed and/or proprietary computer application. A service may execute on a server. The term "server" may include hardware (e.g., a computer including a processor and a memory) that is configured to execute service software. A server may include an operating system optimized for executing services. A service may be a part of, included with, or tightly integrated with a server operating system. A server may include a network interface connection for interfacing with a computer network to facilitate operative communication between client devices and client software, and/or other servers and services that execute thereon.

Server hardware may be virtually allocated to a server operating system and/or service software through virtualization environments, such that the server operating system or service software shares hardware resources such as one or more processors, memories, system buses, network interfaces, or other physical hardware resources. A server operating system and/or service software may execute in virtualized hardware environments, such as virtualized operating system environments, application containers, or any other suitable method for hardware environment virtualization.

Technology infrastructure 800 may also include client devices. A client device may be a computer or other processing device including a processor and a memory that stores client computer software and is configured to execute client software. Client software is software configured for execution on a client device. Client software may be configured as a client of a service. For example, client software may make requests to one or more services for data and/or processing of data. Client software may receive data from, e.g., a service, and may execute additional processing, computations, or logical steps with the received data. Client software may be configured with a graphical user interface such that a user of a client device may interact with client computer software that executes thereon. An interface of client software may facilitate user interaction, such as data entry, data manipulation, etc., for a user of a client device.

A client device may be a mobile device, such as a smart phone, tablet computer, or laptop computer. A client device may also be a desktop computer, or any electronic device that is capable of storing and executing a computer application (e.g., a mobile application). A client device may include a network interface connector for interfacing with a public or private network and for operative communication with other devices, computers, servers, etc., on a public or private network.

Technology infrastructure 800 includes network routers, switches, and firewalls, which may comprise hardware, software, and/or firmware that facilitates transmission of data across a network medium. Routers, switches, and firewalls may include physical ports for accepting physical network medium (generally, a type of cable or wire—e.g., copper or fiber optic wire/cable) that forms a physical computer network. Routers, switches, and firewalls may also have "wireless" interfaces that facilitate data transmissions via radio waves. A computer network included in technology infrastructure 800 may include both wired and wireless components and interfaces and may interface with servers and other hardware via either wired or wireless communications. A computer network of technology infrastructure 800 may be a private network but may interface with a public network (such as the internet) to facilitate operative communication between computers executing on technology infrastructure 800 and computers executing outside of technology infrastructure 800.

FIG. 8 further depicts exemplary computing device 802. Computing device 802 depicts exemplary hardware that executes the logic that drives the various system components described herein. Servers and client devices may take the form of computing device 802. While shown as internal to technology infrastructure 800, computing device 802 may be external to technology infrastructure 800 and may be in operative communication with a computing device internal to technology infrastructure 800.

In accordance with aspects, system components such as an alarm management service, a causal inference module, client devices, servers, various database engines and database services, and other computer applications and logic may include, and/or execute on, components and configurations the same, or similar to, computing device 802.

Computing device 802 includes a processor 803 coupled to a memory 806. Memory 806 may include volatile memory and/or persistent memory. The processor 803 executes computer-executable program code stored in memory 806, such as software programs 815. Software programs 815 may include one or more of the logical steps disclosed herein as a programmatic instruction, which can be executed by processor 803. Memory 806 may also include data repository 805, which may be nonvolatile memory for data persistence. The processor 803 and the memory 806 may be coupled by a bus 809. In some examples, the bus 809 may also be coupled to one or more network interface connectors 817, such as wired network interface 819, and/or wireless network interface 821. Computing device 802 may also have user interface components, such as a screen for displaying graphical user interfaces and receiving input from the user, a mouse, a keyboard and/or other input/output components (not shown).

In accordance with aspects, services, modules, engines, etc., described herein may provide one or more application programming interfaces (APIs) in order to facilitate communication with related/provided computer applications and/or among various public or partner technology infrastructures, data centers, or the like. APIs may publish various methods and expose the methods, e.g., via API gateways. A published API method may be called by an application that is authorized to access the published API method. API methods may take data as one or more parameters or arguments of the called method. In some aspects, API access may be governed by an API gateway associated with a corresponding API. In some aspects, incoming API method calls may be routed to an API gateway and the API gateway may forward the method calls to internal services/modules/engines that publish the API and its associated methods.

A service/module/engine that publishes an API may execute a called API method, perform processing on any data received as parameters of the called method, and send a return communication to the method caller (e.g., via an API gateway). A return communication may also include data based on the called method, the method's data parameters and any performed processing associated with the called method.

API gateways may be public or private gateways. A public API gateway may accept method calls from any source without first authenticating or validating the calling source. A private API gateway may require a source to authenticate or validate itself via an authentication or validation service before access to published API methods is granted. APIs may be exposed via dedicated and private communication channels such as private computer networks or may be exposed via public communication channels such as a public computer network (e.g., the internet). APIs, as discussed herein, may be based on any suitable API architecture. Exemplary API architectures and/or protocols include SOAP (Simple Object Access Protocol), XML-RPC, REST (Representational State Transfer), or the like.

The various processing steps, logical steps, and/or data flows depicted in the figures and described in greater detail herein may be accomplished using some or all of the system components also described herein. In some implementations, the described logical steps or flows may be performed in different sequences and various steps may be omitted. Additional steps may be performed along with some, or all of the steps shown in the depicted logical flow diagrams. Some steps may be performed simultaneously. Some steps may be performed using different system components. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a processor and/or in the form of statically or dynamically programmed electronic circuitry.

The system of the invention or portions of the system of the invention may be in the form of a "processing device," a "computing device," a "computer," an "electronic device," a "mobile device," a "client device," a "server," etc. As used herein, these terms (unless otherwise specified) are to be understood to include at least one processor that uses at least one memory. The at least one memory may store a set of instructions. The instructions may be either permanently or temporarily stored in the memory or memories of the processing device. The processor executes the instructions that are stored in the memory or memories in order to process data. A set of instructions may include various instructions that perform a particular step, steps, task, or tasks, such as those steps/tasks described above, including any logical steps or logical flows described above. Such a set of instructions for performing a particular task may be characterized herein as an application, computer application, program, software program, service, or simply as "software." In one aspect, a processing device may be or include a specialized processor. As used herein (unless otherwise indicated), the terms "module," and "engine" refer to a computer application that executes on hardware such as a server, a client device, etc. A module or engine may be a service.

As noted above, the processing device executes the instructions that are stored in the memory or memories to process data. This processing of data may be in response to commands by a user or users of the processing device, in response to previous processing, in response to a request by another processing device and/or any other input, for example. The processing device used to implement the invention may utilize a suitable operating system, and instructions may come directly or indirectly from the operating system.

The processing device used to implement the invention may be a general-purpose computer. However, the processing device described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing device be physically located in the same geographical place. That is, each of the processors and the memories used by the processing device may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing device what to do with the data being processed.

Further, it is appreciated that the instructions or set of instructions used in the implementation and operation of the invention may be in a suitable form such that the processing device may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing device, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing device, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing device, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by a processor.

Further, the memory or memories used in the processing device that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing device or machines that are used to implement the invention. As used herein, a user interface includes any hardware, software, or combination of hardware and software used by the processing device that allows a user to interact with the processing device. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing device as it processes a set of instructions and/or provides the processing device with information. Accordingly, the user interface is any device that provides communication between a user and a processing device. The information provided by the user to the processing device through the user interface may be in the form of a command, a selection of data, or some other input, for example.

As discussed above, a user interface is utilized by the processing device that performs a set of instructions such that the processing device processes data for a user. The user interface is typically used by the processing device for interacting with a user either to convey information or receive information from the user. However, it should be appreciated that in accordance with some aspects of the system and method of the invention, it is not necessary that a human user actually interact with a user interface used by the processing device of the invention. Rather, it is also contemplated that the user interface of the invention might interact, i.e., convey and receive information, with another processing device, rather than a human user. Accordingly, the other processing device might be characterized as a user. Further, it is contemplated that a user interface utilized in the system and method of the invention may interact partially with another processing device or processing devices, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

The invention claimed is:

1. A method comprising:

receiving, at an alarm management service, a plurality of alarms generated in a network, wherein each of the plurality of alarms includes respective alarm data including an alarm identifier, a device identifier, an alarm start timestamp and an alarm end timestamp;

clustering the plurality of alarms into an alarm cluster group based on time factors and/or a persistent homology technique, wherein the persistent homology technique is based on topological features of a topology of the network;

generating a plurality of binary time sequences, wherein each of the plurality of binary time sequences corresponds to one of the plurality of alarms and wherein each of the plurality of binary time sequences is generated based on the alarm start timestamp and the alarm end timestamp of a corresponding alarm of the plurality of alarms;

generating an initial alarm graph based on the alarm cluster group, the topology of the network, and the plurality of binary time sequences, wherein the initial alarm graph is a completely connected, undirected graph based on the plurality of alarms being generated for each received alarm identifier including the alarm identifier;

providing, as input to a causal inference process, the initial alarm graph and the plurality of binary time sequences; and generating, by the causal inference process, a causal alarm graph based on the input, wherein the causal alarm graph is a partially connected and directed graph and wherein the partially connected and directed graph comprises a direction of each edge in the partially connected and directed graph;

wherein the generating the initial alarm graph includes deleting an edge from between a first node of the initial alarm graph and a second node of the initial alarm graph when: (i) a first node device identifier associated with the first node is different from a second node device identifier associated with the second node; (ii) there is an absence of a network connection between a network device represented by the first node and a network device represented by the second node; and (iii) there is an absence of overlap between active intervals defined by the alarm start timestamp and the alarm end timestamp of the corresponding alarm of the plurality of alarms, where in the plurality of alarms are associated with the first node and the second node in their corresponding binary time sequences of the plurality of binary time sequences.

2. The method of claim 1, comprising:

deleting the edge from between the first node of the initial alarm graph and the second node of the initial alarm graph based on an absence of an alarm represented by the first node from the alarm cluster group.

3. A system comprising at least one computer including a processor, wherein the at least one computer is configured to:

receive, at an alarm management service, a plurality of alarms generated in a network, wherein each of the plurality of alarms includes respective alarm data including an alarm identifier, a device identifier, an alarm start timestamp and an alarm end timestamp;

cluster the plurality of alarms into an alarm cluster group based on time factors and/or a persistent homology technique, wherein the persistent homology technique is based on topological features of a topology of the network;

generate a plurality of binary time sequences, wherein each of the plurality of binary time sequences corresponds to one of the plurality of alarms and wherein each of the plurality of binary time sequences is generated based on the alarm start timestamp and the alarm end timestamp of a corresponding alarm of the plurality of alarms;

generate an initial alarm graph based on the alarm cluster group, the topology of the network, and the plurality of binary time sequences, wherein the initial alarm graph is a completely connected, undirected graph based on the plurality of alarms being generated for each received alarm identifier including the alarm identifier;

provide, as input to a causal inference process, the initial alarm graph and the plurality of binary time sequences; and generate, by the causal inference process, a causal alarm graph based on the input, wherein the causal alarm graph is a partially connected and directed graph and wherein the partially connected and directed graph comprises a direction of each edge in the partially connected and directed graph;

wherein the generating the initial alarm graph includes deleting delete an edge from between a first node of the initial alarm graph and a second node of the initial alarm graph when: (i) a first node device identifier associated with the first node is different from a second node device identifier associated with the second node; (ii) there is an absence of a network connection between a network device represented by the first node and a network device represented by the second node; and (iii) there is an absence of overlap between active intervals defined by the alarm start timestamp and the alarm end timestamp of the corresponding alarm of the plurality of alarms, where in the plurality of alarms are associated with the first node and the second node in their corresponding binary time sequences of the plurality of binary time sequences.

4. The system of claim 3, wherein the at least one computer is configured to:

deleting the edge from between the first node of the initial alarm graph and the second node of the initial alarm graph based on absence of an alarm represented by the first node from the alarm cluster group.

5. A non-transitory computer readable storage medium, including instructions stored thereon, which instructions, when read and executed by one or more computer processors, cause the one or more computer processors to perform steps comprising:

receiving, at an alarm management service, a plurality of alarms generated in a network, wherein each of the plurality of alarms includes respective alarm data including an alarm identifier, a device identifier, an alarm start timestamp and an alarm end timestamp;

clustering the plurality of alarms into an alarm cluster group based on time factors and/or a persistent homology technique, wherein the persistent homology technique is based on topological features of a topology of the network;

generating a plurality of binary time sequences, wherein each of the plurality of binary time sequences corresponds to one of the plurality of alarms and wherein each of the plurality of binary time sequences is generated based on the alarm start timestamp and the alarm end timestamp of a corresponding alarm of the plurality of alarms;

generating an initial alarm graph based on the alarm cluster group, the topology of the network, and the plurality of binary time sequences, wherein the initial alarm graph is a completely connected, undirected graph based on the plurality of alarms being generated for each received alarm identifier;

providing, as input to a causal inference process, the initial alarm graph and the plurality of binary time sequences; and generating, by the causal inference process, a causal alarm graph based on the input, wherein the causal alarm graph is a partially connected and directed graph and wherein the partially connected and directed graph comprises a direction of each edge in the partially connected and directed graph;

where in the generating the initial alarm graph includes deleting an edge from between a first node of the initial alarm graph and a second node of the initial alarm graph when: (i) a first node device identifier associated with the first node is different from a second node device identifier associated with the second node; (ii) there is an absence of a network connection between a network device represented by the first node and a network device represented by the second node; and (iii) there is an absence of overlap between active intervals defined by the alarm start timestamp and the alarm end timestamp of the corresponding alarm of the plurality of alarms, wherein the plurality of alarms are associated with the first node and the second node in their corresponding binary time sequences of the plurality of binary time sequences.

6. The non-transitory computer readable storage medium of claim 5, comprising:

deleting the edge from between the first node of the initial alarm graph and the second node of the initial alarm graph based on an absence of a network connection between a network device represented by the first node and a network device represented by the second node.

* * * * *